United States Patent [19]

Rough

[11] 3,992,183

[45] Nov. 16, 1976

[54] APPARATUS FOR REFINING GLASS

[75] Inventor: Robert R. Rough, Toledo, Ohio

[73] Assignee: Owens-Illinois, Inc., Toledo, Ohio

[22] Filed: Jan. 20, 1975

[21] Appl. No.: 542,691

Related U.S. Application Data

[63] Continuation of Ser. No. 494,133, Aug. 2, 1974, abandoned, which is a continuation of Ser. No. 321,771, Jan. 8, 1973, abandoned.

[52] U.S. Cl. ............................ 65/178; 65/134; 233/1 R; 233/23 R
[51] Int. Cl.² .......................................... C03B 5/16
[58] Field of Search .............. 65/134, 302, 71, 178; 233/11, 28, 1 C, 1 R, 27, 23 R

[56] References Cited

UNITED STATES PATENTS

| | | | |
|---|---|---|---|
| 2,006,947 | 7/1935 | Ferguson | 65/134 |
| 2,007,755 | 7/1935 | Ferguson | 65/134 |
| 3,257,235 | 6/1966 | Steele et al. | 233/23 R |
| 3,754,886 | 8/1973 | Richards | 65/134 |
| 3,819,350 | 6/1974 | Pellett et al. | 65/134 |

Primary Examiner—Robert L. Lindsay, Jr
Attorney, Agent, or Firm—D. T. Innis; E. J. Holler

[57] ABSTRACT

An apparatus for refining molten glass comprising a shell mounted in a generally vertical position and having an intermediate cylindrical portion and frusto-conical end portions, refractory material within the shell defining a glass-receiving chamber. The shell is supported by bearings mounted upon a base and engaging the frusto-conical end portions of the shell. Drive means are interposed between the lower frusto-conical end portion and the lower bearing for rotating the shell about its generally vertical axis. A housing surrounds the shell. The shell is cooled by circulating air continuously in the area between the shell and the housing. The bearings are both lubricated and cooled by forcing oil about the bearings. Unrefined molten glass is delivered to the upper end of the shell, rotated, and the refined molten glass is removed from the lower end of the chamber.

2 Claims, 5 Drawing Figures

APPARATUS FOR REFINING GLASS

This is a continuation, of application Ser. No. 494,133, filed Aug. 2, 1974 which is a continuation of application Ser. No. 321,771, filed Jan. 8, 1973, both abandoned.

BACKGROUND OF THE INVENTION

This invention relates to apparatus for refining glass. The principal objective of melting and refining glass is to produce a molten glass that is useful for the intended purposes. Among the criteria utilized to determine the quality of the molten glass are the absence of seeds or bubbles caused by entrapped gas and insufficiently melted materials. The intended use of the glass determines the extent to which seeds can be retained in the glass. Such seeds are a necessary result of the chemical reactions that occur during the melting of the glass-forming materials. Seeds are also described in the art as gaseous inclusions. Large seeds are designated blisters; however, there is no sharp line or demarcation between the classification of seeds and blisters. Seeds generally fall into the size range of 0.0001 inch to 0.030 inch in diameter. This apparatus removes gaseous inclusions most effectively when the seeds are in the range of about 0.001 inch to 0.030 inch and upwards in diameter. However, the operating parameters may be varied to remove seeds of a smaller size, such as increasing the residence time of the molten glass.

In making glass by conventional methods in commercial quantity, the glass-forming materials are usually introduced into a melter which comprises a large volumetric area and are subjected to large quantities of heat. The glass is maintained in the melting area for long periods of time and small quantities are continuously removed as they become molten. The glass is then further subjected to controlled heat in a large volumetric mass to further melt the components that may be interspersed therein and remove gases, and finally the glass is moved slowly to a third volumetric area known as a conditioning zone. Such prior art methods and apparatus involve very large tanks and large quantities of heat in order to produce the desired output.

In the copending application of Richards et al, Ser. No. 130,672, filed Apr. 2, 1971, titled "Method and Apparatus for Refining Molten Glass", now U.S. Pat. No. 3,754,886, having a common assignee with the present application, there is disclosed and claimed a method and apparatus for refining molten glass which has undesirable gaseous inclusions.

The method disclosed in the aforementioned application for removing undesirable gaseous inclusions, also known as seeds and bubbles, from seed containing or unrefined molten glass comprises continuously introducing this unrefined molten glass into a rapidly rotating contained glass mass, subjecting the unrefined molten glass mass to centrifugal forces substantially greater than gravity, and developing static pressure differences in the glass mass, resulting in pressure gradients in the molten glass that cause the gaseous inclusions to migrate to areas of lower static pressure and to the atmosphere from the molten glass, delivering refined molten glass from the contained glass mass having reduced numbers of gaseous inclusions.

Among the objects of the present invention are to provide an improved apparatus for refining glass which utilizes the method of the aforementioned application; which apparatus will function effectively and be maintained readily with long life; which apparatus includes means for controlling the temperature thereof; which apparatus further includes means for lubricating and cooling the apparatus as well as the bearings utilized therein.

SUMMARY OF THE INVENTION

In accordance with the invention, the apparatus for refining glass comprises a shell having refractory material therein and including upper and lower open ends, the glass being delivered to the upper end and removed from the lower end. The shell includes an intermediate cylindrical portion and frusto-conical end portions and is supported by bearings engaging the end portions. Drive means are interposed between the lower frusto-conical end portion and the lower bearing. A housing surrounds the shell and provision is made for cooling the shell and the housing.

DESCRIPTION

Figure 1:
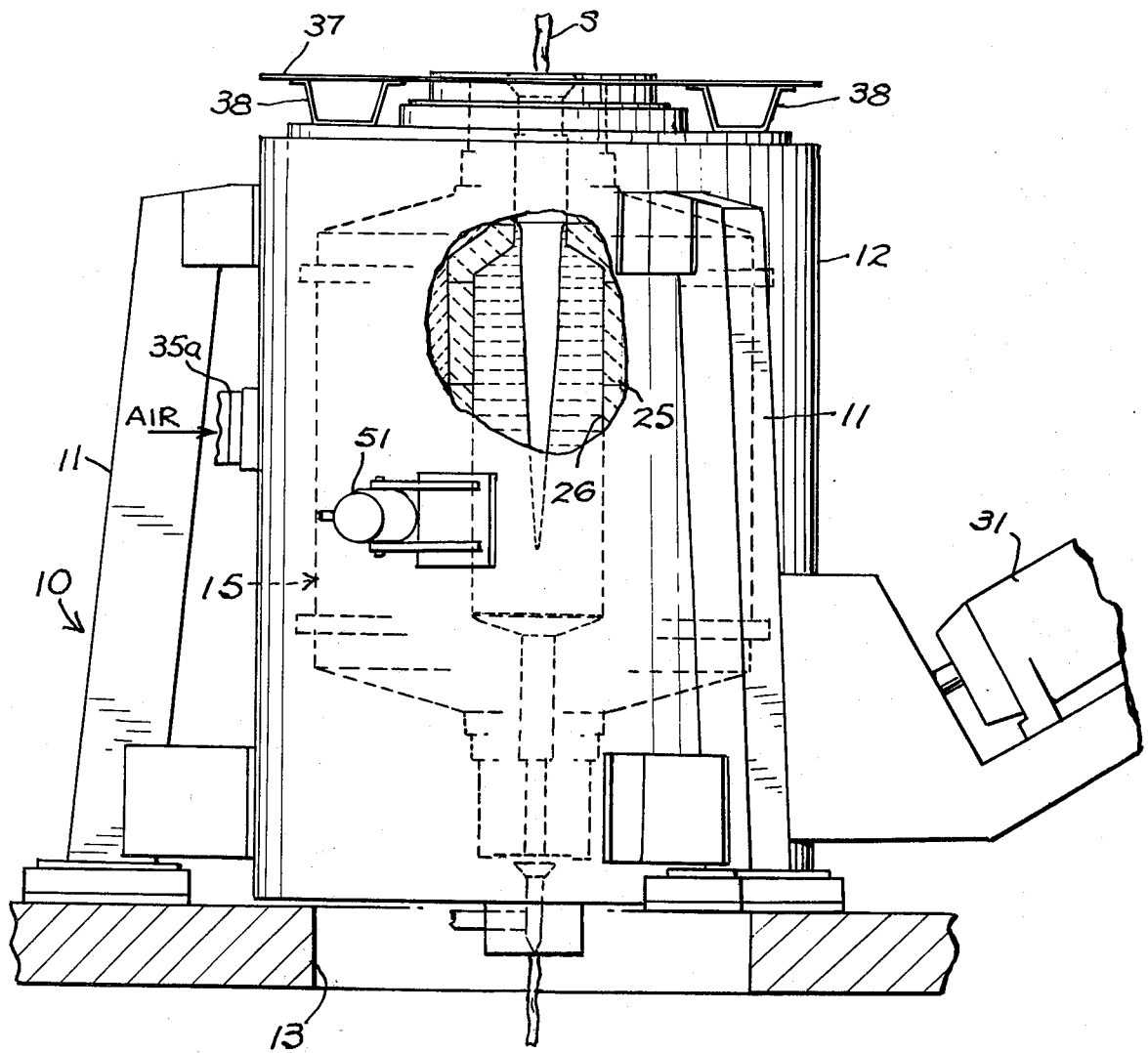
FIG. 1 is a plan view of an apparatus embodying the invention.
Figure 5:
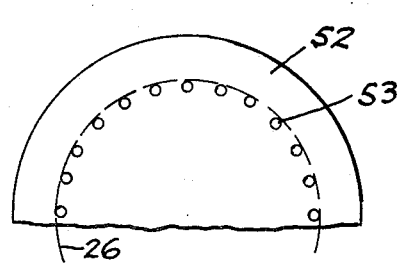
FIG. 5 is a fragmentary plan view of a part of the apparatus.

Referring to FIG. 1, the apparatus for refining glass comprises a base 10 which includes circumferentially spaced uprights 11 that support a cylindrical outer housing 12, usually in overlying relationship to a opening 13 in a floor. A metal shell 15 is rotatably mounted within and supported by the housing 12 as presently described. The shell 15 includes an intermediate portion 16 that is cylindrical and generally frusto-conical end portions 17 and 18 having axially extending end portions 19a, 20a, and peripheral cylindrical portions 19b and 20b, the latter being connected to the cylindrical portion 16. Ball bearings 21 and 22 of conventional construction including an inner race, an outer race, and a plurality of balls, are provided on the axial extensions 19 and 20. The outer race of the bearings 21 and 22 are supported by generally radially extending end plates 23 and 24, which form the top and bottom portions of the housing 12. Refractory material 25 is provided within the shell 15 to form a chamber 26 for receiving glass. The upper and lower ends of chamber 26 are open. The glass is delivered in a stream S through the open upper end 27 downwardly into the chamber. The radially extending end plate 24 provides a support for the bearing 22. Bearing 22 rests upon a recess 61 in the end plate structure. End plate structure 24 has flange 59. Flange 59 rests upon the flange of the housing; the weight of the rotating structure is carried by the bearing. The bearing is supported by end plate 24 which is supposedly the housing 12, thus the entire weight of the rotating structure is supported by the bottom bearing structure and the housing.

Provision is made for rapidly rotating the shell 15 in order to provide centrifugal forces on the glass in the chamber and comprises a bevel gear 28 fixed to the axial portion 20 of shell 15 at the area of junction of the axial portion 20a of shell 15 with its frusto-conical portion 18. The bevel gear 28 is engaged by a bevel pinion 29 on a drive shaft 30 rotatably mounted by bearings in a bracket fixed on the housing 12. An electric motor 31 engages the shaft 30 through a coupling 33 to provide the desired drive. The motor and drive arrangement are such as to rotate the shell, for example, to about 1,250 revolutions per minute.

Figure 2:
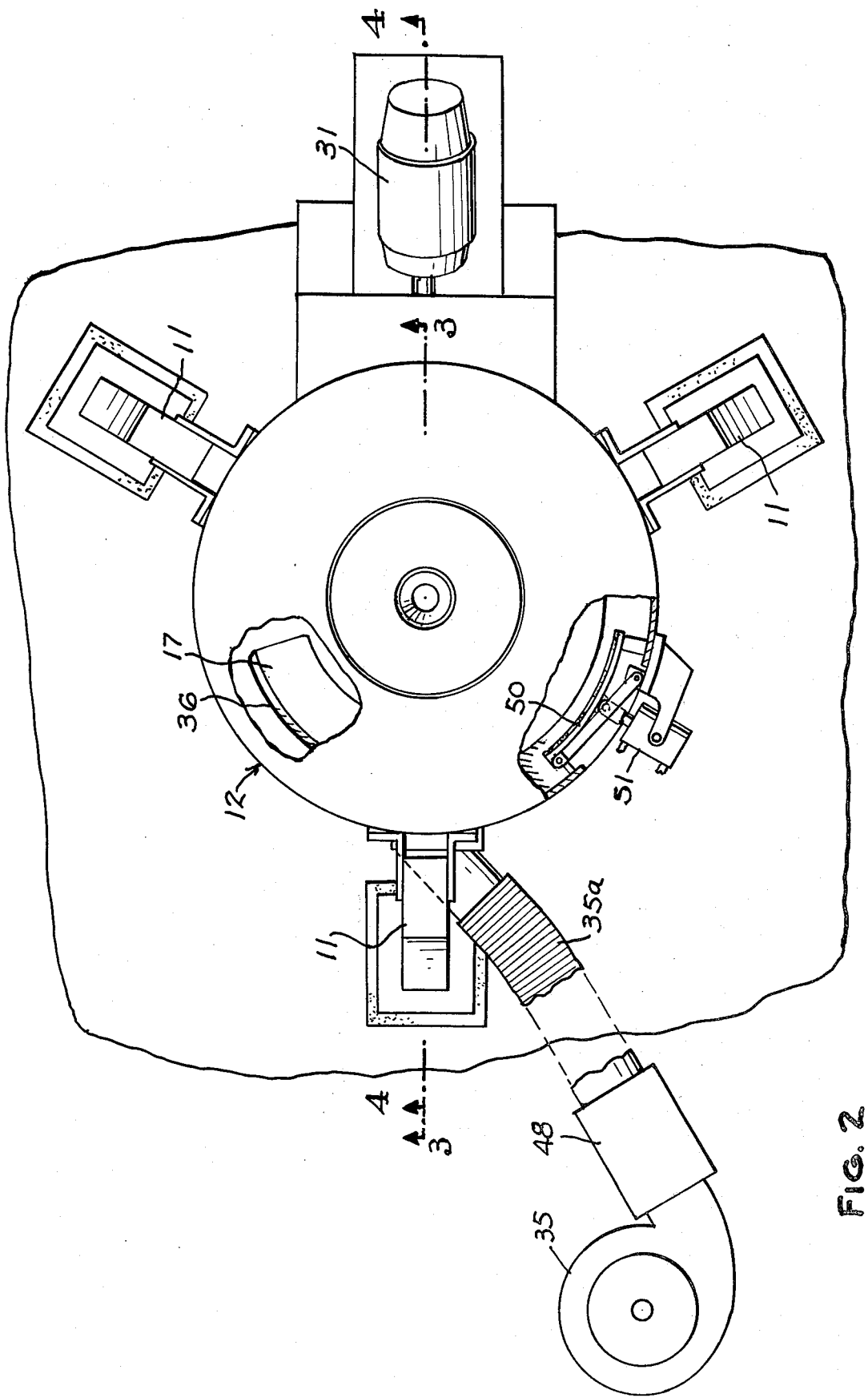
FIG. 2 is a part sectional plan view of the same.
Figure 3:
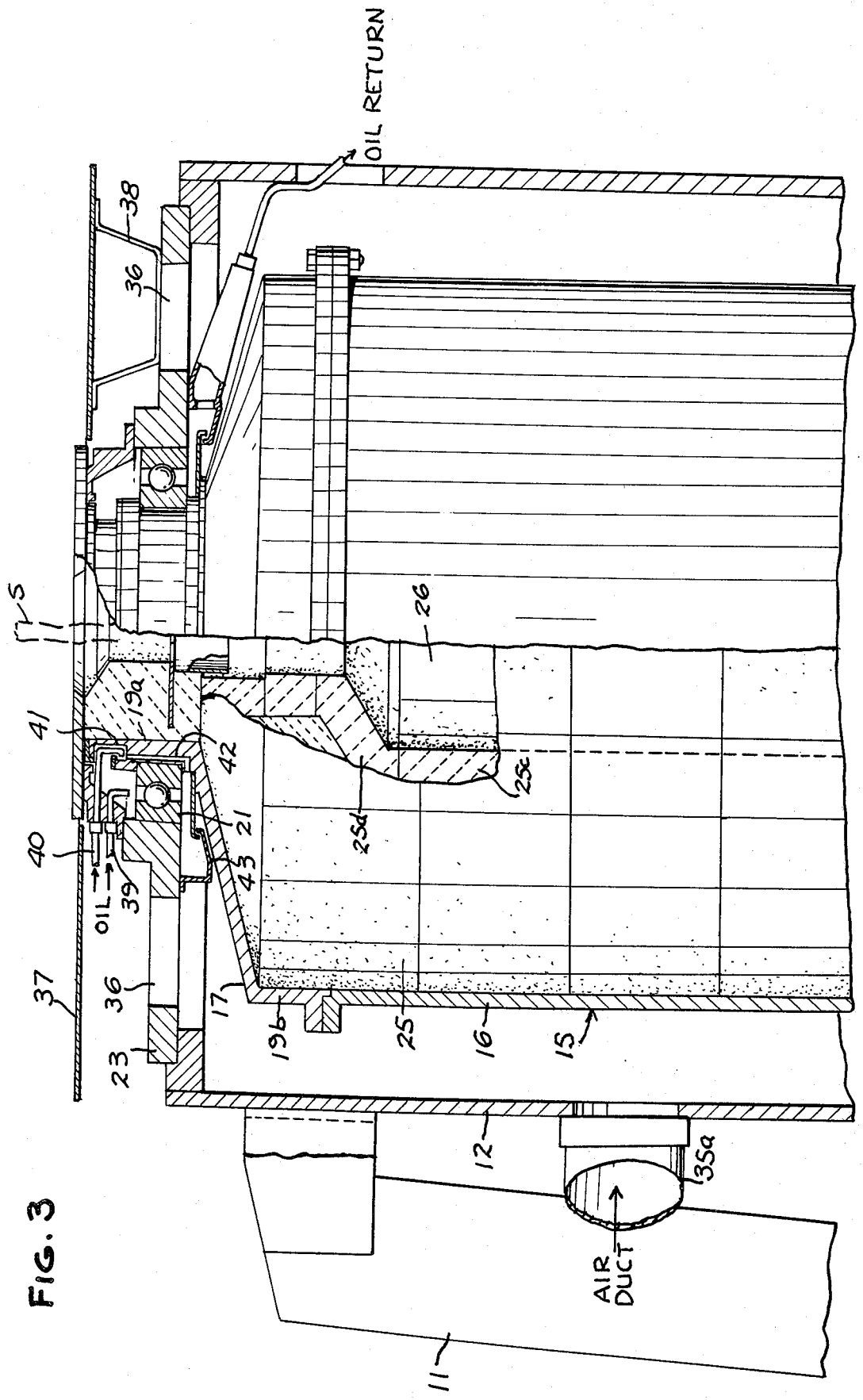
FIG. 3 is a fragmentary sectional view on a enlarged scale taken along the line 3—3 in FIG. 2.

Referring to FIGS. 1 to 3, provision is made for cooling the shell and includes a blower 35 that feeds air through conduit 35a tangentially into the housing 12 in the space between the housing 12 and the shell 15. The air flows upwardly and exits through openings 36 in the top wall 23. A deflector 37 extends generally horizontally and is supported by circumferentially spaced brackets 38 on top plate 23 in overlying and spaced relationship to the top wall 23 so that air is deflected laterally outwardly. The air thus functions in part also to cool the bearing 21.

Provision is made for further lubricating and cooling the bearing 21 and comprises a plurality of circumferentially spaced pipe lines 39 that extends into overlying relationship with the center of the bearing 21 to direct oil downwardly onto the balls. Further, for additional cooling, lubricant is delivered by a plurality of circumferentially spaced pipe lines 40 into an annular channel 41 and passes through one or more axial openings 42 in the axial extension 19 to a collecting trough 43 from which the oil is drained through pipe 44. A catch pan 58 (FIG. 4) encircles the outer periphery of the lower axial extending portion of the shell.

Similarly, in the lower bearing, a plurality of circumferentially spaced pipe lines 45 and 46 delivers oil to the balls of the bearing 22 and axial openings 47, respectively.

The blowers 35 can be adapted by means of a heater 48 to supply heated air, if desired, to control the temperature of the shell 15 and, in turn, the molten glass in the chamber 26.

As shown in FIG. 2, an arcuate brake pad 50, actuated by an air cylinder 51, is provided for decelerating the rotating shell 15 as may be required.

Figure 4:
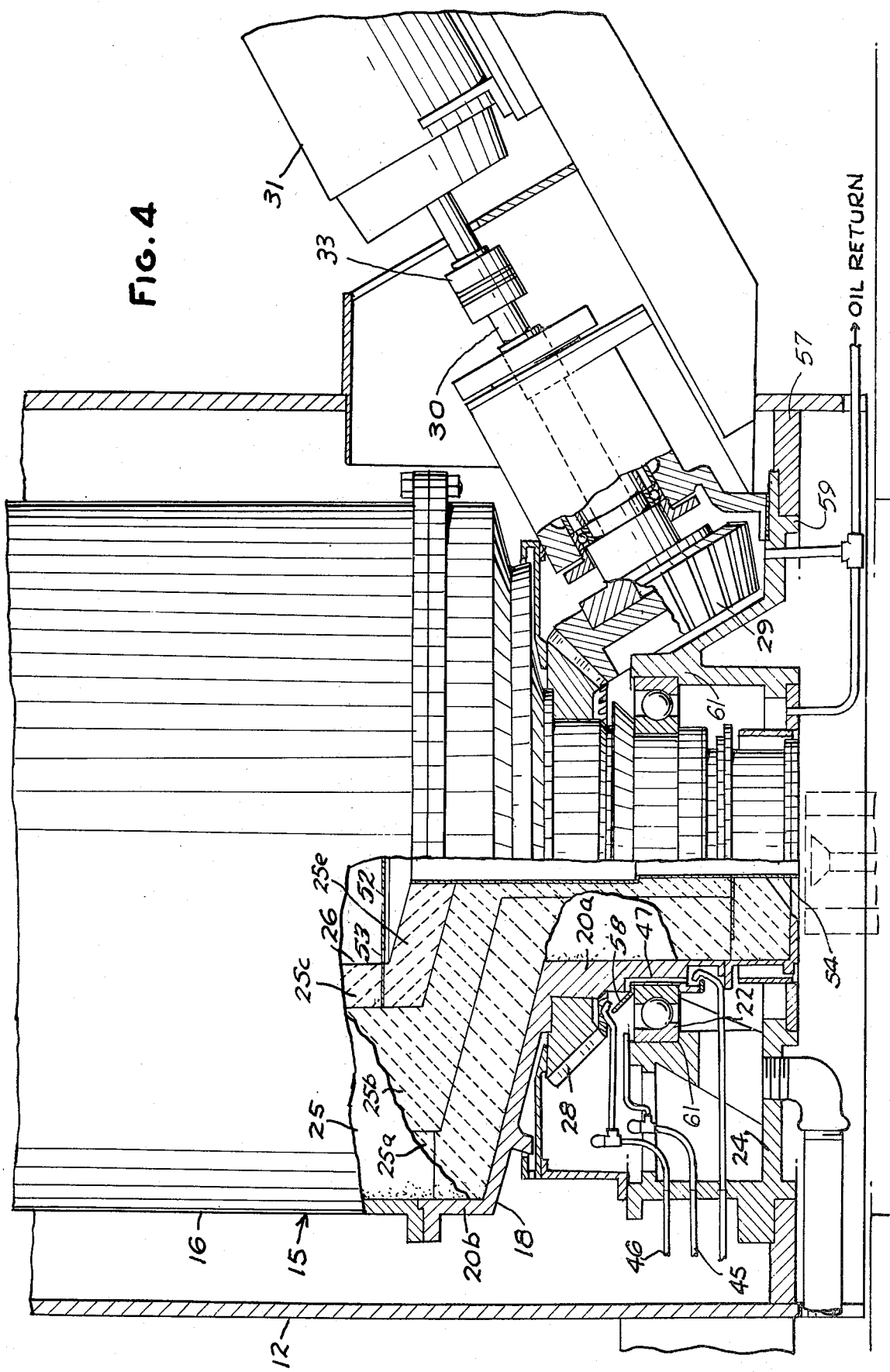
FIG. 4 is a fragmentary sectional view on an enlarged scale taken along the line 4—4 in FIG. 2.

Referring to FIGS. 1, 3 and 4, the refractory 25 comprises three layers — an outer precast layer 25a of blocks, an intermediate layer 25b cast in situ, and an inner precast layer 25c of blocks. The upper and lower ends of the outer and inner layers 25a and 25c comprise precast frusto-conical elements 25d and 25e. A diverter plate 52 is positioned in the lower end of the apparatus and comprises a metal plate having opening 53 adjacent the wall of the chamber to cause all the glass to be diverted through areas of high centrifugal force prior to passing to the outlet tube 54 extending from element 25e.

In operation, the glass is continuously delivered to the open upper end of the shell into the chamber 26, and the mass of glass in the chamber is continuously subjected to centrifugal force to form a void at the center of the glass and to cause the gaseous inclusions to be moved towards the void, the refined molten glass being delivered downwardly to the opening in the lower axial extension 20 for use.

The apparatus is designed for a steady state operation over long periods of time. Molten glass is introduced to the apparatus, rotated for a period of time and removed from the apparatus in a substantially constant flow. The molten glass is at a temperature between 2,200° and about 2,600° F. Even though the glass stream is in fairly constant motion, the resulting heat build-up reaches an equilibrium condition, and the temperature surrounding the glass containing chamber is extremely high for prolonged periods of time. The apparatus of this invention provides means for processing molten glass in an extremely high temperature environment with a low probability of any damage to the supporting structure. The forced oil cooling of the bearings and the air cooling of the surrounding shell permits the use of metallic materials in the construction of the bearings and the supporting and rotating mechanism which, absent the invention, do not operate in such a high temperature environment, especially a rotating device.

What is claimed is:
1. In an apparatus for refining glass the combination comprising:
   a housing, having a centrally located top and a bottom opening;
   a top, radially extending, end plate, said end plate partially closing the top opening of the housing;
   a bottom, radially extending, end plate, said bottom end plate partially closing the bottom opening of the housing;
   a top bearing, said bearing supported by the top radially extending end plate;
   a bottom bearing, said bearing supported by the bottom axial extending end plate;
   a shell, said shell comprising an intermediate cylindrical portion, a top frusto-conical end portion, a bottom frusto-conical end portion, each of said frusto-conical end portions having an axially extending portion;
   said top bearing comprising an inner race, an outer race and a plurality of balls, positioned between the races permitting the rotation of the outer race about the inner race;
   said top inner race being positioned about the outer peripheral surface of the top axially extending portion of the shell, said outer race supported by said top radially extending end plate;
   said top radially extending end plate rotatably positioning said shell relative to the housing;
   said bottom bearing rotatably supporting the shell and positioning it relative to the housing;
   an annular channel, said annular channel circumscribing said top axial extending portion of said shell;
   a plurality of passages communicating with said annular channel, said passages in the top axially extending portion of the shell, an end of each of said passages connected to said channel, said annular channel and said axial passages providing a passage for cooling air to flow from said annular channel through said passages thus serving to cool the axial extending portion of the shell;
   an oil supply pipeline, said pipeline extending into said shell and having a delivery end, said delivery end positioned so as to deliver oil to said top annular channel which surrounds the upper axially extending portion of the shell;
   said bottom bearing comprising an inner race, an outer race, and a plurality of balls positioned between the races permitting rotation of the outer race about the balls;
   said inner bearing race positioned about the outer surface of the bottom axially extending portion of said shell;
   said outer race position so as to be supported by said bottom radially extending end plate;

a plurality of passages in the outer surface of the lower axially extending portion of the shell, said passages positioned between the shell and the bearing race and the axially extending portion of the shell;

a catch pan, said catch pan and said passages being connected providing a passage for cooling oil from the pan to the several passages;

a second pipeline having a delivery end, said end positioned over said circular catch pan for delivery of cooling oil to said circular catch pan, and means for collecting the spent oil.

2. Apparatus for refining glass comprising a shell said shell supported for rotation within a housing, said shell comprising an intermediate cylindrical portion;

a pair of frusto-conical end portions, each end portion having an axially extending portion which is smaller in diameter than the cylindrical portion of the shell;

a top bearing;

a bottom bearing, each of said bearings having an inner race and an outer race, a plurality of balls interposed between the bearing races;

said top bearing inner race being positioned about the surface of the axially extending portion of the shell;

said bottom bearing inner race positioned about the surface of the bottom axially extending portion of the shell;

said top and bottom bearings in contact with portions of the axially extending portions of the shell; said bearings supported within said housing by end plates;

said shell being rotatable within the said housing;

a bottom bearing support comprising laterally extending end plates, having a circular flange and said end plate forming a bottom for said housing and having a circular flange, said flange resting on portions of said housing flange, a circular catch pan positioned so as to encircle the lower axially extending portion of said shell and positioned above the lower bearing assembly;

said axially extended lower portion of the shell having a plurality of passages formed in the surface of the extending portion, a portion of the passage being formed by a surface of the inner bearing race;

oil supply pipelines, one pipeline being positioned so as to discharge cooling oil into the circular catch pan;

said circular catch pan and said passages connected forming a flow path for cooling oil; and means for collecting and returning said spent cooling oil so that the cooling oil flowing in the passages between the axially extending portions and the inner races bearing acts as a coolant and prevents the expansion of the axially extending portion against the inner race of the bearing.

* * * * *